(12) United States Patent
Kim

(10) Patent No.: US 6,941,306 B2
(45) Date of Patent: Sep. 6, 2005

(54) METHOD AND SYSTEM FOR ACCESSING DATA BY USING SOAP-XML

(75) Inventor: Hyoung Sun Kim, Daejeon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 87 days.

(21) Appl. No.: 10/098,443

(22) Filed: Mar. 18, 2002

(65) Prior Publication Data

US 2003/0110167 A1 Jun. 12, 2003

(30) Foreign Application Priority Data

Dec. 12, 2001 (KR) .......................................... 2001-78586

(51) Int. Cl.[7] .............................................. G06F 17/30
(52) U.S. Cl. ..................................... 707/10; 707/104.1
(58) Field of Search ........................ 707/4, 10, 103 R, 707/104.1; 705/1, 5; 702/127; 709/2, 3, 206, 218; 713/201; 718/100, 102

(56) References Cited

U.S. PATENT DOCUMENTS

2002/0169851 A1 * 11/2002 Weathersby et al. ........ 709/218
2003/0110167 A1 * 6/2003 Kim .............................. 707/4
2003/0195762 A1 * 10/2003 Gleason et al. ................ 705/1

FOREIGN PATENT DOCUMENTS

KR 9863503 10/1998
KR 0125949 4/2001

OTHER PUBLICATIONS

Younghwan Kim, "A CORBA-Based Client/Server Architecture For Integrating Web Applications", Graduate School of Management, Korea Advanced Institute of Science and Technology, 1997.

* cited by examiner

Primary Examiner—Apu M Mofiz
(74) Attorney, Agent, or Firm—Mayer, Brown, Rowe & Maw LLP

(57) ABSTRACT

A computer implemented data access system uses an SOAP-XML for use in an Internet web environment. The data access system includes a client, a web server, an EJB and service server and a gateway. The client requests a query language to receive a service request. The web server generates a SOAP-XML message and makes possible Internet web services by using DLL files if the SOAP-XML message is written by an ASP. The EJB and service server changes the SOAP-XML message to a DTD type SOAP-XML message if the SOAP-XML message is written by a JSP and, then, provides the DTD type SOAP-XML message to the client. The gateway requests the query language to a DB server; receives the result value for the service request; and provides the result value to the EJB and service server.

7 Claims, 4 Drawing Sheets

METHOD AND SYSTEM FOR ACCESSING DATA BY USING SOAP-XML

FIELD OF THE INVENTION

The present invention relates to a method and a system for accessing data by using a SOAP (single object access protocol)-XML (extended markup language); and, more particularly, to a method and a system for realizing an effective data exchange between remote places and successively accessing databases located at the remote places to provide a variety of web services by using a SOAP communications system which supports an XML-based standard protocol.

BACKGROUND OF THE INVENTION

In present days, network construction has become an increasingly important factor for successive business activities of a company. In today's business environment, research centers, production bases and business places of the company are scattered all around the world, so that it is important to connect them successively in order to survive in fierce competitions and to obtain competitiveness. Accordingly, there has been intensified a demand for information service environment in which a wide variety of information can be systematically shared and exchanged.

In an existing distributed computing environment in which various data can be efficiently shared between different types of computer systems located at different sites, it is essentially required to access databases at remote places and download the data in a web environment. Though the existing distributed computing environment supports a lot of object-oriented middleware and API (application program interfaces), the above-described necessity has not been satisfied yet.

In other words, though various prior art methods have been introduced to provide a web service in the distributed computing environment, such methods have certain drawbacks. For instance, in a traditional data accessing technology such as an object linking embedding (OLE) DB technique and an open DataBase connectivity (ODBC) technique, a client component corresponding to a server of a data provider should be installed in a client system to access an application program server and desired data. Further, a COM (component object model) object interface should be distributed for the operation of this system.

Among various object-oriented middleware for connecting a client to a server in the web environment is there, for example, a CORBA (common object request broker architecture). However, the CORBA still exhibits many defects caused by the use of a CGI (common gateway interface). Moreover, a processing speed of the CORBA is remarkably reduced in Internet communications. As another example of the object-oriented middleware, a DCOM (distributed component object model) also has a drawback in that it is subject to an operating system (OS) of Windows.

Methods for providing a web service in the distributed computing environment are implemented in a Korean Publication No. 2001-25959 invention titled "M/W system for integrating multiple databases and a method for accessing distributed different type databases by using same", a Korean Patent No. 1998-63503 invention titled "Computer apparatus and method for communicating between software applications and computers on the world-wide web, and an invention disclosed in a thesis published in September, 1997 titled "A CORBA-Based Client/Server Architecture For Integrating Web Applications".

The followings are detailed descriptions of the above identified prior art inventions.

The Publication No. 2001-25949 invention titled "M/W system for integrating multiple databases and a method for accessing distributed different type databases by using same" provides a middleware system for integrating multiple databases and a method for accessing different types of databases by using the middleware system. By such a middleware system, a user can access distributed different types of databases where information is stored according to different data models. In this system, if a client receives a query from the user, the client accesses through a broker an integrated server for processing information about the database that the user desires to access. Then, the query language is analyzed, converted and optimized and the result is provided from a processor to the client. By using this multiple database middleware system, various application programs and different types of data servers can be effectively connected.

The invention disclosed in the Korean Patent No. 1998-63503 titled "COMPUTER APPARATUS AND METHOD FOR COMMUNICATING BETWEEN SOFTWARE APPLICATIONS AND COMPUTERS ON THE WORLD-WIDE WEB" provides a computer system and method for implementing an access a software application from a web browser over the worldwide web (WWW). The system includes one or more computers executing a web browser, a web server application, an application gateway, and a software application. The user inputs data via the web browser, which is communicated to the web server application. The web server application authenticates the web browser and passes appropriate input data to an application gateway, including data to uniquely identify and track the user's request. The application gateway then performs the function requested in the web server input data by formatting the appropriate commands with the software application. The software application responds by outputting data to the application gateway that includes an identifier that the application gateway uses to match the output data with the web browser that requested the output data. This system thus allows numerous web browsers access the software application simultaneously.

The invention disclosed in the thesis published in September 1997 provides a CORBA-based client/server architecture for integrating Web applications. Java-based integration with CORBA is found to be more flexible and acceptable than CGI-based integration, and thus Java is employed for our architecture. The architecture consists of four components, Web client, Web server, ORB middleware, and object implementation server. To illustrate the usefulness of the architecture, Web applications are implemented for a real-life bank.

As described above, the technologies that are disclosed in the above-identified thesis and patented inventions exhibit certain deficiencies in establishing information service environment where a wide variety of information can be systematically shared and exchanged to thereby construct a worldwide information network.

SUMMARY OF THE INVENTION

It is, therefore, an object of the present invention to provide a method and a system for realizing an effective data exchange between remote places and successively accessing databases located at the remote places to provide a variety of web services by using a SOAP communications system which supports an XML-based standard protocol.

In accordance with one aspect of the present invention, there is provided A data access system using an SOAP-XML (single object access protocol-extended markup language) for use in an Internet web environment, including: a client for requesting a query language so as to receive a service request by using a web browser incorporated therein and receiving as a respond to the query language a result value for the service request to allow a user to see the result; a web server for generating a SOAP (single object access protocol)-XML (extended markup language) message and making possible Internet web services by using DLL (dynamic linking library) files if the SOAP-XML message is written by an ASP (active server page);an EJB (enterprise java beans) and service server for changing the SOAP-XML message to a DTD (document type definition) type SOAP-XML message if the SOAP-XML message is written by a JSP (java server page) and providing the DTD type SOAP-XML message to the client; and a gateway for requesting the query language for receiving the service request to a DB (DataBase) server, receiving as a respond to the query language the result value for the service request and providing the result value to the EJB and service server.

In accordance with another aspect of the present invention, there is provided A method for accessing data in an Internet web environment including a client, a web server, an EJB and a service server and a gateway, including the steps of: checking an IP (internet protocol) and a port of a web server and accessing the web server if the web server is found to be the one that a user desires to access to thereby request a query language for receiving a service request; generating a SOAP-XML message in a SOAP API in the web server according to the query language from the client and providing the generated SOAP-XML message to the client; accessing a survlet engine in the EJB and service server to provide the query language for obtaining the service request if it is determined from the SOAP-XML message provided from the SOAP API that a client application is involved; performing a method of session beans and a method of entity beans, respectively, for the service request to request an access to the gateway; receiving the method conducted by the EJB entity bean from the gateway, raising to the DB server a query for the service request in conformity with SQL conditions, receiving a result value for the service request as a response to the query, converting the result value to a SOAP-XML message and providing the SOAP-XML message to a service server in the EJB and service server; and converting the SOAP-XML message to a DTD (document type definition) type SOAP-XML message and provide the DTD type SOAP-XML message including the result value for the service request to the client to allow the user see the result.

BRIEF DESCRIPTION OF THE DRAWINGS

The above and other objects and features of the invention will become apparent from the following description given in conjunction with the accompanying drawings, in which.

DETAILED DESCRIPTION OF THE PREFERRED EMBODIMENTS

Figure 1:
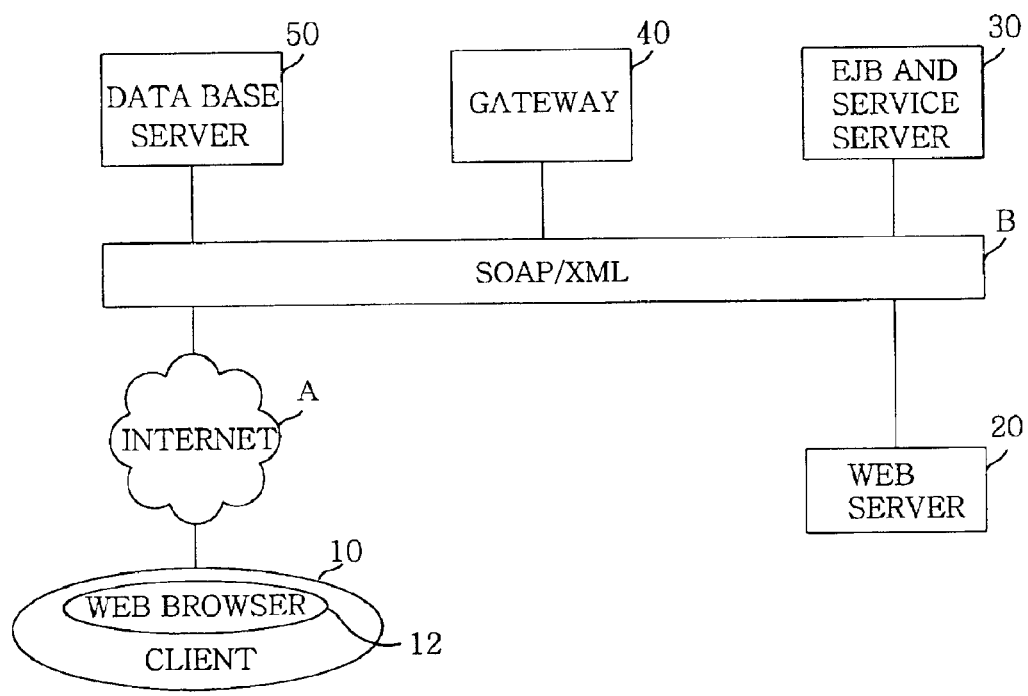
FIG. 1 is a block diagram of a data accessing apparatus using an SOAP-XML in accordance with the present invention.

Referring to FIG. 1, there is provided a block diagram of a data access system using a SOAP-XML (single object access protocol-extended markup language) in accordance with the present invention. The system includes a client 10, a web server 20, an EJB (enterprise java beans) and service server 30, a gateway 40 and a database (DB) server 50.

The client 10 has an internal web browser 12. If a user provides a query language for a service request, e.g., general information of the user, the client 10 checks an IP and a port of a web server. If the web server is found to be the one, i.e., the web server 20, that the user desires to access, the client 10 accesses to the web server 20 through Internet A and a SOAP/XML B to request the query language for receiving the service request, e.g., the general information of the user.

Figure 2:
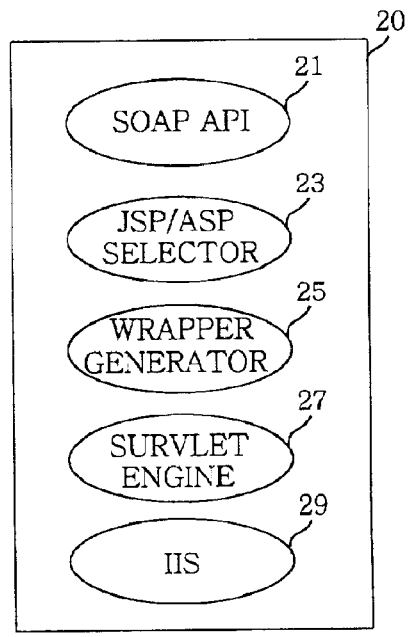
FIG. 2 provides a detailed block diagram of a web server shown in FIG. 1.
Figure 3:
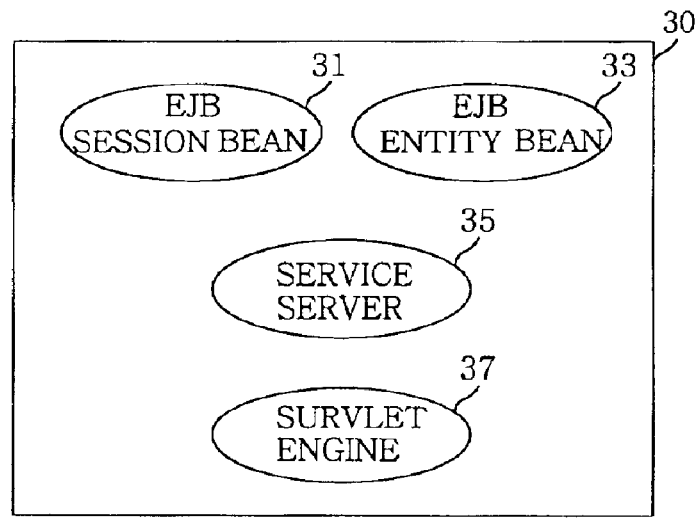
FIG. 3 illustrates a detailed block diagram of an EJB and service server shown in FIG. 1.
Figure 4:
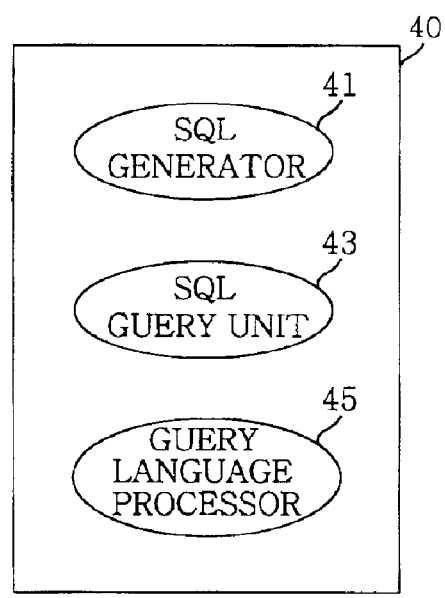
FIG. 4 offers a detailed block diagram of a gateway shown in FIG. 1.

Thereafter, the client 10 checks whether a web browser or a client application is involved by referring to a SOAP-XML message provided from a SOAP API 21, as shown in FIG. 2, within the web server 20. In case the web browser is involved, the client 10 accesses with a given URL (uniform resource locator) to a survlet engine 27 in the web server 20 through the Internet A and the SOAP/XML B. In case the client application is involved, on the other hand, the client 10 accesses a survlet engine 37 in the EJB and service server 30 through the Internet A and the SOAP/XML B without passing through the web server 20 to provide the query language for receiving the service request, e.g., the general information of the user.

Referring to FIG. 2, the web server 20 includes the SOAP API 21, a JSP/ASP selector 23, a wrapper generator 25, the survlet engine 27 and an IIS (Internet information server) 29.

The SOAP API 21 generates a SOAP-XML message according to the query language provided from the client 10 for receiving the service request, e.g., the general information of the user, and provides the generated SOAP-XML message to the client 10 through the SOAP/XML B and the Internet A.

The JSP/ASP selector 23 checks the programming language of the SOAP-XML message. As a result, if the message is written by a JSP (java server page), a channel to the EJB and service server 30 is selected while if the message is written by an ASP (active server page), a channel to the web server 20 is chosen.

If the channel to the web server 20 is selected, the wrapper generator 25 generates a visual basic wrapper class for use in the ASP to create a new activeX DLL (dynamic linking library) project. Then, the wrapper generator 25 changes the name of the created project, adds *.cls files and changes the properties of the *.cls files to thereby generate necessary DLL files.

The IIS 29 installs the DLL files created by the wrapper generator 25 in the web server 20 to make possible web services.

The channel to the EJB and service server 30 is selected when the SOAP-XML message by the JSP/ASP selector 23 is written by the JSP. The EJB and service server 30 is a block for analyzing a DTD (document type definition) type SOAP-XML message and generating a HTML document and conducts a business logic according to a service request. The EJB and service server 30 includes an EJB session bean 31, an EJB entity bean 33, a service server 35 and a survlet engine 37.

The EJB session bean 31 performs a method of session beans through a plurality of components. The EJB entity bean 33 performs a method of entity beans through the plurality of components and requests an access to the gateway 40.

The service server 35 converts the SOAP/XML message provided from a query processor 45 in the gateway 40 to a DTD type SOAP-XML message and decides whether or not the converted message contains any error. If no error is found, the service server 35 provides to the web browser 12 in the client 10 the DTD type SOAP-XML message including a result value for the service request, e.g., the general information of the user, through the SOAP/XML B and the Internet A.

The gateway 40 is a block for checking a load, a transaction and a pooling of the whole system. The gateway 40 includes a SQL generator 41, a SQL query unit 43, a query language processor 45.

The SQL generator 41 receives the method performed by the EJB entity bean 33 in the EJB and service server 30 and automatically generates a SQL according to SQL conditions.

The SQL query unit 43 receives the method performed by the EJB entity bean 33 within the EJB and service server 30 and raises to the DB server 50 a query for the service request (e.g., the general information of the user) in conformity with the SQL conditions.

The query language processor 45 receives the result value for the service request as a response to the query raised by the SQL query unit 43. Then, the query language processor 45 changes the given result value to a SOAP-XML message and provides the SOAP-XML message to the service server 35 in the EJB and service server 30.

Figure 5A:
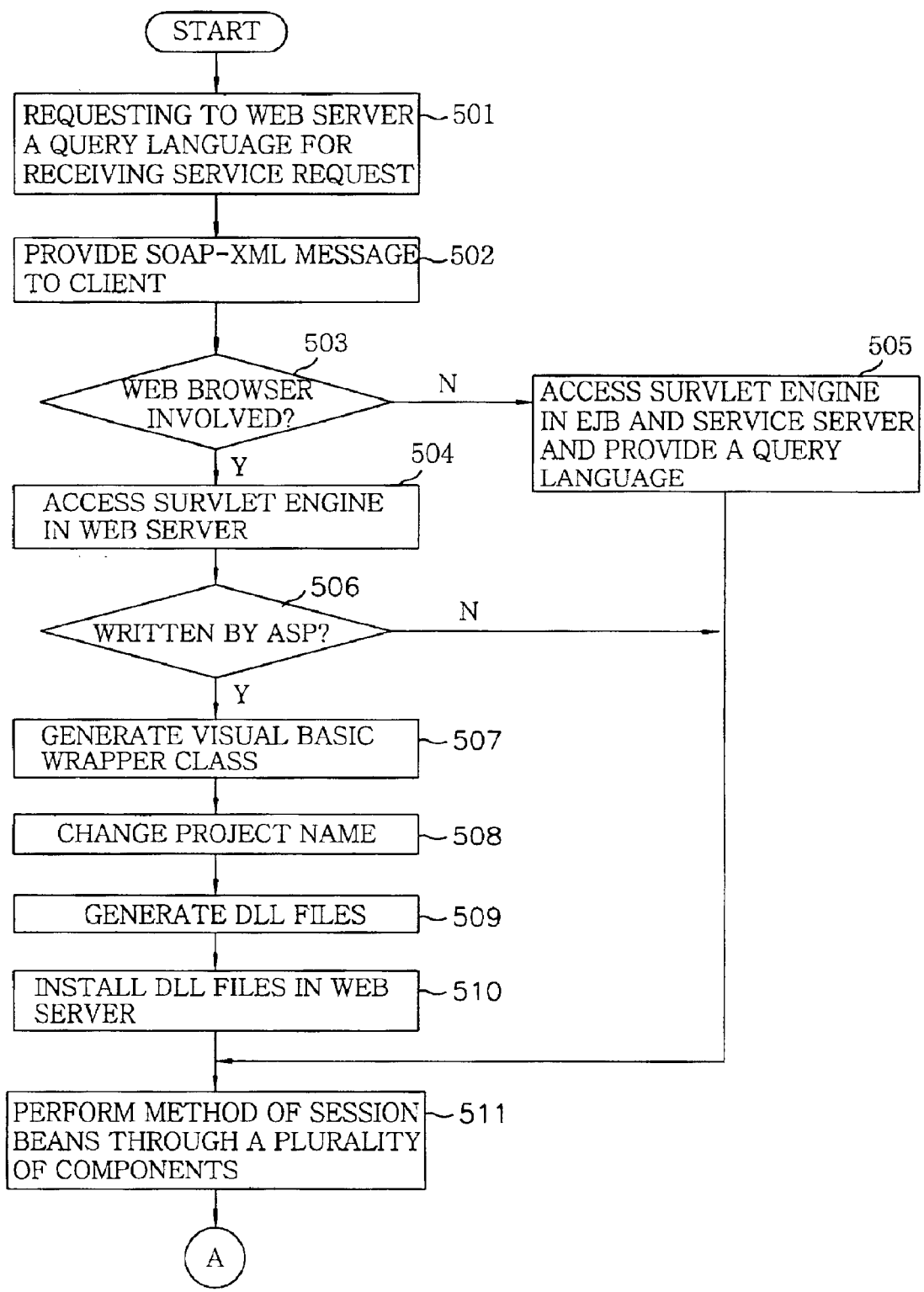
FIG. 5 depicts a flowchart for describing a data accessing method using the SOAP-XML in accordance with the present invention.
Figure 5B:
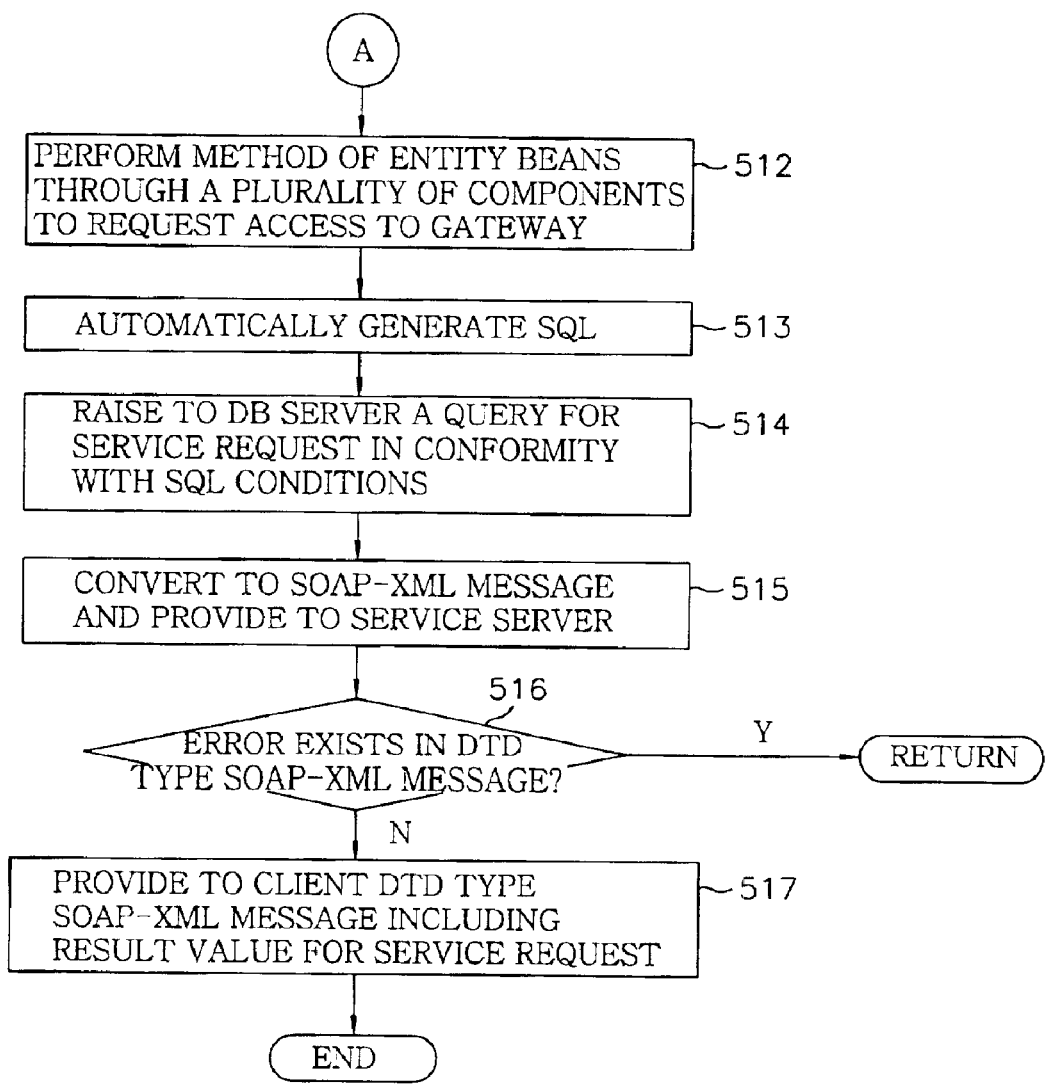

Referring to FIG. 5, there is described a method for accessing data by using the SOAP-XML having the above-described configurations in accordance with the present invention.

The client 10 represents a mobile terminal, a personal digital assistant (PDA), a personal computer (PC), etc. The client 10 includes an internal web browser 12. After receiving from the user a query language for a service request, e.g., general information of the user, the client 10 checks an IP and a port of a web server. Then, if the web server is found to be the one, i.e., a web server 20, that the user desires to access, the client 10 accesses the web server 20 through the Internet A and the SOAP/XML B to request a query language for receiving the service request, e.g., the general information of the user (Step 501).

The SOAP API 21 within the web server 20 generates an SOAP-XML message according to the query language from the client 10 for receiving the requested service, e.g., the general information of the user and, then, provides the generated SOAP-XML message to the client 10 through the SOAP-XML B and the Internet A (Step 502).

Thereafter, the client 10 checks whether a web browser or a client application is involved by referring to the SOAP-XML message provided from the SOAP API 21 (Step 503).

If it is determined in the step 503 that the web browser is involved, the client 10 accesses with a given URL the survlet engine 27 in the web server 20 through the Internet A and the SOAP/XML B (Step 504).

If it is determined in the step 503 that the client application is involved, on the other hand, the client 10 accesses the survlet engine 37 in the EJB and service server 30 through the Internet A and the SOAP/XML B without passing through the web server 20, and, then, provides to the survlet engine 37 the query language for obtaining the service request, e.g., the general information of the user (Step 505).

In case the client 10 accesses the survlet engine 27 in the web server 20, the JSP/ASP selector 23 determines whether the SOAP-XML message is written by the JSP or the ASP (Step 506).

If it is determined in the step 506 that the message is created by the ASP, the channel to the web server 20 is selected. The wrapper generator 25 in the web server 20 generates a visual basic wrapper class for use in the ASP (Step 507) and creates a new ActiveX DLL project and changes the title of the project (Step 508). Then, the wrapper generator 25 adds *.cls files and changes the properties of those *.cls files to generate necessary DLL files (Step 509) Subsequently, the wrapper generator 25 installs in the web server 20 the DLL files generated by the wrapper generator 25 by using the IIS 29 to make possible the web service (Step 510).

If it is determined in the Step 506 that the SOAP-XML message is written by the JSP, on the other hand, the client 10 selects the channel to the EJB and service server 30. Then, the session bean 31 in the EJB and service server 30 performs a method of session beans by using a plurality of components (Step 511). Then, the EJB entity bean 33 conducts a method of entity beans through the plurality of components to request an access the gateway 40.

Thereafter, the SQL generator 41 in the gateway 40 receives the method performed by the EJB entity bean 33 in the EJB and service server 30 and automatically generates a SQL in conformity with the SQL conditions (Step 513). The SQL query unit 43 receives the method conducted by the EJB entity bean 33 in the EJB and service server 30 and raises to the DB server 50 a query for the service request (e.g., the general information of the user) in conformity with the SQL conditions (Step 514).

The query language processor 45 is given from the DB server 50 a result value for the service request (e.g., the general information of the user) as a response to the query raised by the SQL query unit 43 and, then, converts the result value to a SOAP-XML message. Thereafter, the SOAP-XML message is provided to the service sever 35 in the EJB and service server 30 (Step 515).

The service server 35 in the EJB service server 30 changes the SOAP-XML message processed by and provided from the query language processor 45 to the DTD type SOAP-XML message, and, then, checks whether the DTD type SOAP-XML message has an error or not (Step 516).

If an error is detected in the DTD type SOAP-XML message in the Step 516, the process is returned to Step 501. If no error is found, however, the service server 35 provides to the web browser 12 in the client 10 the DTD-type SOAP-XML message including the result value for the service request, e.g., the general information of the user, through the SOAP/XML B and the Internet A (Step 517).

As described above, the present invention provides a method and an apparatus for effectively performing a data exchange between remote places by using a SOAP communications system which supports an XML-based standard protocol to successively access a data base located at remote locations and provide a variety of services.

Though the invention has been shown and described with reference to the preferred embodiments, it would be understood by those skilled in the art that various changes and modifications may be made without departing from the spirit and scope of the invention defined in the following claims.

What is claimed is:

1. A computer implemented data access system using an SOAP-XML (single object access protocol-extended markup language) for use in an Internet web environment, comprising:

a client for requesting a query language so as to receive a service request by using a web browser incorporated therein and receiving as a respond to the query language a result value for the service request to allow a user to see the result;

a web server for generating a SOAP(single object access protocol)-XML (extended markup language) message and making possible Internet web services by using DLL (dynamic linking library) files if the SOAP-XML message is written by an ASP (active server page);

an EJB (enterprise java beans) and service server for changing the SOAP-XML message to a DTD (document type definition) type SOAP-XML message if the SOAP-XML message is written by a JSP (java server page) and providing the DTD type SOAP-XML message to the client; and a gateway for requesting the query language for receiving the service request to a DB (DataBase) server, receiving as a respond to the query language the result value for the service request and providing the result value to the EJB and service server, wherein the web server includes:

a SOAP API (application program interface) for generating the SOAP-XML message according to the query language from the client for receiving the service request and providing the generated SOAP-XML message to the client;

a JSP/ASP selector for checking the programming language of the SOAP-XML message and selecting a channel to the EJB and service server in case the SOAP-XML message is written by the JSP while choosing a channel to the web server in case the SOAP-XML message is written by the ASP;

a wrapper generator for generating a visual basic wrapper class for use in the ASP if it is determined by the JSP/ASP selector that the SOAP-XML message is written by the ASP, creating a new ActiveX DLL project, changing the name of the project, adding *.cls files and changing the properties of the *.cls files to generate necessary DLL files; and an IIS (internet information server) for installing the generated DLL files in the web server to make possible the web services.

2. The system of claim 1, wherein the client accesses the web server by using a given URL (uniform resource locator) in case the SOAP-XML message generated at the web server is a web browser but accesses the EJB and service server to provide thereto the query language for receiving the service request in case the SOAP-XML message is a client application.

3. The system of claim 1, wherein the EJB and service server includes:

an EJB session bean for performing a method of session beans through a plurality of component;

an EJB entity bean for performing a method of entity beans through the plurality of components and requesting an access to the gateway; and a service server for changing the SOAP-XML message provided from the gateway to the DTD type SOAP-XML message, checking whether or not the DTD type SOAP-XML message contains any error and, if no error is found, providing to the client the DTD type SOAP-XML message including the result value for the service request.

4. The system of claim 1, wherein the gateway includes:

a SQL generator for receiving the method performed by the EJB entity bean in the EJB and service server to automatically generate a SQL in conformity with SQL conditions;

a SQL query unit for receiving the method conducted by the EJB entity bean in the EJB and service server to raising to the DB server a query for the service request in conformity with the SQL conditions; and a query language processor for receiving as the respond to the query raised by the SQL query unit the result value for the service request, changing the result value to the SOAP-XML message and providing the SOAP-XML message to the service server in the EJB and service server.

5. The system of claim 1, wherein the client, the web server, the EJB and service server, the gateway, the DB server tranceive data by using the SOAP-XML.

6. A method for accessing computer implemented data in an Internet web environment including a client, a web server, an EJB and a service server and a gateway, comprising the steps of:

checking an IP (internet protocol) and a port of a web server and accessing the web server if the web server is found to be the one that a user desires to access to thereby request a query language for receiving a service request;

generating a SOAP-XML message in a SOAP API in the web server according to the query language from the client and providing the generated SOAP-XML message to the client;

accessing a survlet engine in the EJB and service server to provide the query language for obtaining the service request if it is determined from the SOAP-XML message provided from the SOAP API that a client application is involved;

performing a method of session beans and a method of entity beans, respectively, for the service request to request an access to the gateway;

receiving the method conducted by the EJB entity bean from the gateway, raising to the DB server a query for the service request in conformity with SQL conditions, receiving a result value for the service request as a response to the query, converting the result value to a SOAP-XML message and providing the SOAP-XML message to a service server in the EJB and service server;

converting the SOAP-XML message to a DTD (document type definition) type SOAP-XML message and provide the DTD type SOAP-XML message including the result value for the service request to the client to allow the user see the result;

accessing a survlet engine in the web server by using a URL (uniform resource rotator) if it is determined from the SOAP-XML message provided from the SOAP API that a web browser is involved;

determining in a JSP/ASP selector whether the SOAP-XML message is written by a JSP or an ASP in case the client accesses the web server;

generating in a wrapper generator in the web server a visual basic wrapper for use in the ASP, creating a new Active DLL project and changing the name of the project to generate DLL files if it is determined that the SOAP-XML message is written by the ASP; and installing the generated DLL files in the web server by using an IIS (Internet information server) to thereby make possible web services.

7. The method of claim 6, wherein the client, the EJB and service server, the gateway, the DB server transceive data by using the SOAP/XML.

* * * * *